United States Patent
Swanson et al.

(10) Patent No.: US 8,634,832 B2
(45) Date of Patent: Jan. 21, 2014

(54) MOBILE LOCATION RECOVERY FOR MSC POOLING

(75) Inventors: Robert Swanson, Allen, TX (US); Gary Stephens, Richardson, TX (US); Mahmud Alam, Ottawa (CA); Mark Hebert, Whitewright, TX (US); Michael Mertz, McKinney, TX (US); Roy Smith, Forney, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 10 days.

(21) Appl. No.: 12/951,549

(22) Filed: Nov. 22, 2010

(65) Prior Publication Data

US 2012/0129524 A1 May 24, 2012

Related U.S. Application Data

(60) Provisional application No. 61/371,937, filed on Aug. 9, 2010.

(51) Int. Cl.
*H04W 4/00* (2009.01)
*H04W 24/00* (2009.01)
*H04W 68/00* (2009.01)
*H04W 24/02* (2009.01)
*H04W 24/04* (2009.01)

(52) U.S. Cl.
USPC ........ 455/435.1; 455/423; 455/433; 455/458; 455/424

(58) Field of Classification Search
USPC ............... 455/423–425, 433, 458, 435.1
See application file for complete search history.

(56) References Cited

U.S. PATENT DOCUMENTS

| | | | | |
|---|---|---|---|---|
| 5,588,043 | A * | 12/1996 | Tiedemann et al. | 455/435.1 |
| 6,016,425 | A * | 1/2000 | Bannister | 455/432.1 |
| 6,091,953 | A * | 7/2000 | Ho et al. | 455/433 |
| 6,408,182 | B1 * | 6/2002 | Davidson et al. | 455/433 |
| 6,587,691 | B1 * | 7/2003 | Granstam et al. | 455/456.1 |
| 6,888,822 | B2 * | 5/2005 | Svensson et al. | 370/353 |
| 7,171,207 | B2 * | 1/2007 | Artola et al. | 455/445 |
| 7,302,260 | B2 * | 11/2007 | Blom et al. | 455/432.1 |
| 7,340,250 | B2 * | 3/2008 | Sanchez | 455/433 |
| 7,526,301 | B2 * | 4/2009 | Artola et al. | 455/466 |

(Continued)

FOREIGN PATENT DOCUMENTS

| | | | |
|---|---|---|---|
| EP | 2 003 913 A2 | 12/2008 | |
| EP | 2003913 A2 * | 12/2008 | |
| WO | WO 2007045138 A1 * | 4/2007 | H04Q 7/38 |
| WO | WO 2007/115873 A1 | 10/2007 | |

*Primary Examiner* — Matthew Sams

(57) ABSTRACT

An entity of a wireless telecommunications network having a pool of Mobile Switching Centers (MSCs) and a Home Location Register (HLR). The entity includes a network interface which sends pages to mobiles associated with a failed MSC of the pool of MSC's and experiencing termination isolation and receives responses to the pages from at least some of the mobiles. The entity includes a processing unit which produces a registration having updated location information for each response received by the network interface, the registration sent from the network interface to the HLR to end each mobile's termination isolation for which a response was received by the network interface. A method of an entity of a wireless telecommunications network having a pool of Mobile Switching Centers (MSCs) and a Home Location Register (HLR).

8 Claims, 2 Drawing Sheets

(56) References Cited

U.S. PATENT DOCUMENTS

| | | | |
|---|---|---|---|
| 7,840,213 B2 * | 11/2010 | Liu et al. | 455/433 |
| 2002/0187793 A1 * | 12/2002 | Papadimitriou et al. | 455/458 |
| 2004/0063451 A1 * | 4/2004 | Bonta et al. | 455/519 |
| 2005/0250445 A1 * | 11/2005 | Hansson | 455/41.2 |
| 2007/0281686 A1 * | 12/2007 | Liu et al. | 455/433 |
| 2008/0004014 A1 * | 1/2008 | Palviainen | 455/435.1 |
| 2008/0096547 A1 * | 4/2008 | Zhang et al. | 455/424 |
| 2008/0318569 A1 * | 12/2008 | MacNamara et al. | 455/433 |

* cited by examiner

MOBILE LOCATION RECOVERY FOR MSC POOLING

This application claims the benefit of U.S. Provisional Application No. 61/371,937, filed Aug. 9, 2010, the disclosure of which is incorporated herein by reference.

TECHNICAL FIELD

The present invention is related to limiting the interruption time for users of mobiles (mobile terminals) when a Mobile Switching Center (MSC) fails. (As used herein, references to the "present invention" or "invention" relate to exemplary embodiments and not necessarily to every embodiment encompassed by the appended claims.) More specifically, the present invention is related to limiting the interruption time for users of mobiles when an MSC fails by having an entity page the mobiles that have experienced termination isolation.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In today's CDMA architecture, Base Stations (BTS), Base Station Controllers (BSCs), and their related signaling links, are associated with a single Mobile Switching Center (MSC). MSC pooling has been proposed in the 3GPP2 standards to allow BSCs and their related BTSs to connect to multiple MSCs, in case one or more of the MSCs has a critical failure or is isolated from the network.

The related 3GPP2 MSC Pooling standards (S.R0136 and A.S0018) introduce the concept of a Serving Node Selection Function (SNSF). The SNSF logically sits between the MSC and BSC, and routes the associated signaling between the appropriate pooled MSC and the BSC. Once an MSC has a critical failure or is otherwise isolated, the SNSF selects another functional MSC from the MSC pool to serve the mobiles from the failed MSC.

The S.R0136 standard mentions that "When one MSC or MSCe in an MSC Pool breaks down, the interruption time for users being registered in this node should be minimized. In other words, another MSC or MSCe within the MSC Pool shall take over the communication services (e.g., call origination, call delivery, etc.) from this node as quickly as possible." The standard does not give any guidance around shortening any the interruption time for any of these services, only that the interruption is resolved as quickly as possible.

Mobile call originations are not seriously impacted, as those calls will perform an implicit registration with the Home Location Register (HLR) and then route as per normal. Call delivery (mobile termination) interruptions could be longer, as some operators only have their mobiles register with the network once per day to reduce HLR traffic. A shorter call delivery interruption time would be useful.

BRIEF SUMMARY OF THE INVENTION

The present invention pertains to an entity of a wireless telecommunications network having a pool of Mobile Switching Centers (MSCs) and a Home Location Register (HLR). The entity comprises a network interface which sends pages to mobiles associated with a failed MSC of the pool of MSC's and experiencing termination isolation and receives responses to the pages from at least some of the mobiles. The entity comprises a processing unit which produces a registration having updated location information for each response received by the network interface, the registration sent from the network interface to the HLR to end each mobile's termination isolation for which a response was received by the network interface.

The present invention pertains to a method of an entity of a wireless telecommunications network having a pool of MSCs and an HLR. The method comprises the steps of sending pages from a network interface to mobiles associated with a failed MSC of the pool of MSC's and experiencing termination isolation. There is the step of receiving responses to the pages at the network interface from at least some of the mobiles. There is the step of producing a registration having updated location information with a processing unit for each response received by the network interface. There is the step of sending from the network interface the registration to the HLR to end each mobile's termination isolation for which a response was received by the network interface.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
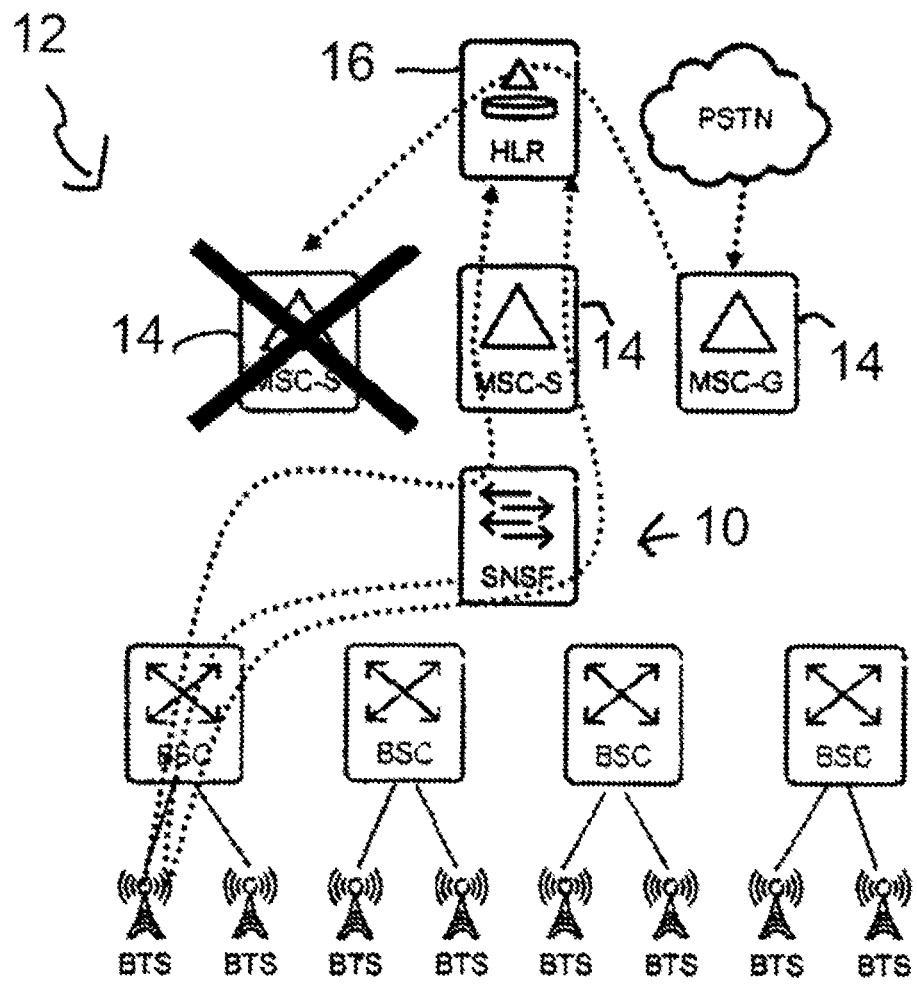
FIG. 1 is a block diagram of a network of the present invention.
Figure 2:
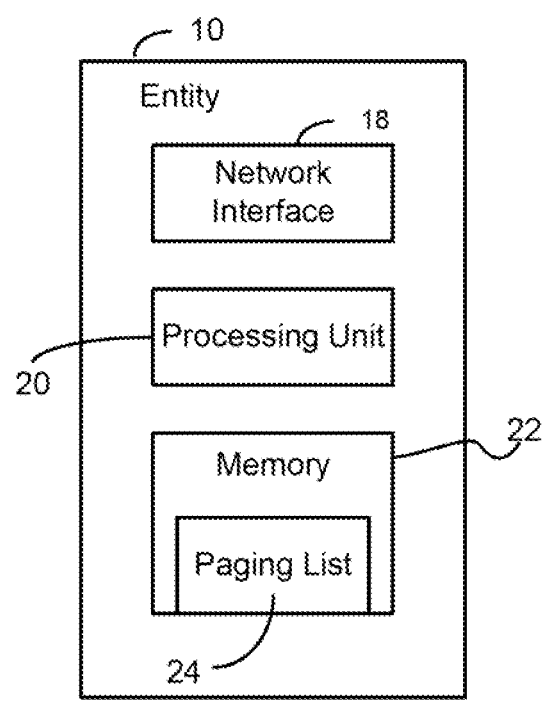
FIG. 2 is a block diagram of an entity of the present invention.

Referring now to the drawings wherein like reference numerals refer to similar or identical parts throughout the several views, and more specifically to FIGS. 1 and 2 thereof, there is shown an entity 10 of a wireless telecommunications network 12 having a pool of MSCs 14 and an HLR 16. The entity 10 comprises a network interface 18 which sends pages to mobiles associated with a failed MSC 14 of the pool of MSC's and experiencing termination isolation and receives responses to the pages from at least some of the mobiles. The entity 10 comprises a processing unit 20 which produces a registration having updated location information for each response received by the network interface 18. The registration is sent from the network interface 18 to the HLR 16 to end each mobile's termination isolation for which a response was received by the network interface 18. The paging list 24 may be in a memory 22.

The processing unit 20 may use a paging list 24 of mobiles known to be assigned to the failed MSC 14 to produce the pages. The processing unit 20 may remove each mobile from the paging list 24 that leaves the pool of MSCs. The processing unit 20 may wait for at least a predetermined period of time for the failed MSC 14 to recover prior to the network interface 18 sending the pages.

The processing unit 20 may cease to send pages if the failed MSC 14 recovers while some of the mobiles associated with the failed MSC 14 have not been sent a page. The network interface 18 may send a message to the failed MSC. 14 upon the failed MSC's recovery that the failed MSC 14 which has recovered is no longer responsible for servicing the mobiles which have been reassigned to another MSC or removed from the active database. The reassignment trigger could be based on page, or page response. An optional removal trigger could be based on page timeout.

The present invention pertains to a method of an entity 10 of a wireless telecommunications network 12 having a pool of MSCs and an HLR 16. The method comprises the steps of sending pages from a network interface 18 to mobiles associated with a failed MSC 14 of the pool of MSC's and experiencing termination isolation. There is the step of receiving responses to the pages at the network interface 18 from at least some of the mobiles. There is the step of producing a registration having updated location information with a processing unit 20 for each response received by the network interface 18. There is the step of sending from the network interface 18 the registration to the HLR 16 to end each mobile's termination isolation for which a response was received by the network interface 18.

The sending step may include the step of using a paging list 24 of mobiles known to be assigned to the failed MSC 14 by the processing unit 20 to produce the pages. There may be the step of the processing unit 20 removing each mobile from the paging list 24 that leaves the pool of MSCs. There may be the step of the processing unit 20 waits for at least a predetermined period of time for the failed MSC 14 to recover prior to the network interface 18 sending the pages.

There may be the step of the processing unit ceasing to send pages if the failed MSC 14 recovers while some of the mobiles associated with the failed MSC 14 have not been sent a page. There may be the step of sending from the network interface 18 a message to the failed MSC 14 upon the failed MSC's recovery that the failed MSC 14 which has recovered is no longer responsible for servicing the mobiles which have been reassigned to another MSC or removed from the active database. The reassignment trigger could be based on page, or page response. An optional removal trigger could be based on page timeout.

In the operation of the invention, an entity 10 in the network 12 pages the mobiles associated with the failed MSC 14. If these mobiles respond to the page, the paging entity sends a registration to the HLR 16 on behalf of the mobile, updating its location information with the HLR 16, and ending the mobile's termination isolation with the network 12.

In the implementation, the SNSF performs the paging function, and sends the registration via the MSC 14, resulting in a REGNOT to the HLR 16. Other instantiations might share these functions (like the SNSF passing the list to another entity), or some other methodology. But the generic invention is to take the list of mobiles known (and therefore remembered) to be assigned to the failed MSC 14, to intelligently have some node or nodes page those mobiles, and to assign those mobiles responding to an MSC 14 that has not failed, particularly including sending ANSI-41 REGNOT messages to identify the new Serving MSC to the HLR 16. It should be noted that the same function performed by the SNSF could be placed at the MSC (one that is still in-service), VLR, or BSC.

As each mobile obtains service from one of the MSCs in the MSC pool (via mobile registration, call origination, or page response), in the serving MSC 14 informs the paging entity 10 of this particular mobile's entry into the pool, and which MSC 14 is serving the mobile. Later, if a pooled MSC 14 fails, the paging entity 10 already has the list of mobiles served by the failed pooled MSC 14.

Additional features of the invention include:
The paging entity 10 may remove mobiles from the paging list 24 when the mobile leaves the MSC 14 pool. This avoids excessive and unnecessary paging.
In case of site failures on the paging entity, a geographically redundant list of mobiles to be paged is maintained.

The paging entity 10 needs to provide settable parameters controlling how long to wait for a site to recover prior to initiating the paging recovery sequence. This prevents starting the paging in the presence of a momentary site failure, versus a catastrophic site failure. Having the settable parameter allows the operators to decide how much time is required to declare a failure as catastrophic.

The paging entity 10 ceases paging operation if the failed MSC 14 returns to availability while some of the mobiles have not been paged.

The paging entity 10 informs the MSC 14 upon its recovery that the MSC 14 is no longer responsible for servicing the mobiles which have been reassigned to another MSC or removed from the active database. The reassignment trigger could be based on page, or page response. An optional removal trigger could be based on page timeout. When the failed MSC 14 returns the availability, an entity within the returned MSC 14 informs the paging entity of the MSC's return to service.

The paging entity 10 shall be able to detect or be informed by the network when an MSC 14 fails/leaves the MSC 14 pool. Potential detection mechanism could include connectivity audits, signaling path failure indications, and notifications from an MSC 14.

FIG. 1 describes the invention.

1. As long as the MSC-G is not the isolated MSC, mobile terminations continue to route to the MSC-G. Otherwise, the terminating call could alternate route to a different MSC-G.
2. Either way, once ANSI-41 call delivery commences for a TLDN, the HLR 16 will not be able to contact the appropriate MSC-S . . . .
3. . . . until the next mobile event triggers the assignment of a new MSC-S, and the VLR location is refreshed. Please note that for this invention discussion, the VLRs are hosted by the same node as the MSCs.
   During the period of mobile termination isolation, mobile terminating calls will be handled according to the HLR's 16 default mechanism for failures to reach the registered Serving MSC 14, including potentially forwarding as per the subscriber HLR 16 profile (e.g. voicemail, CFNA, etc.).
4. In order to shorten the termination isolation time, the paging entity pages the mobiles that were hosted on the affected MSC 14. For any mobiles that respond to the page, the paging entity registers them with the HLR 16.

There are three ways the paging entity 10 can be made aware that a mobile has left the MSC 14 pool: (1) When the mobile registers with another MSC 14 that is outside the MSC 14 Pool, the MSC 14 outside of the pool sends a registration to the HLR 16, and the HLR 16 in turn sends a registration cancellation to the mobile's last serving MSC 14 of the MSC Pool. The pooled MSC 14 that receives the registration cancellation informs the paging entity 10 that the mobile has left the MSC 14 pool; (2) The paging entity 10 detects a page timeout (both from pages within the MSC 14 pool's radio coverage, and from any border cell pages) for the mobile the paging entity 10 was attempting to locate; and (3) The last serving MSC 14 in the pool informs the Paging Entity that there has been no communication from the mobile for an extended period of time and the MSC 14 will no longer be serving that mobile.

The primary generic function of the "page ping" entity is to re-acquire [or maybe even initially acquire] mobile locations. Therefore any wireless operation/service that needed mobile locations could use this entity 10 for the purpose of recovering mobile locations, such as MSC recovery of the VLR (e.g. the VLR crashed) or Wireless location type services recovery.

In summary, this invention reduces the amount of time that a mobile does not receive calls or text messages after the failure or isolation of its MSC 14.

Abbreviations
3GPP2 3$^{rd}$ Generation Partnership Project 2
BSC Base Station Controller
BTS Base Transceiver Station
MSC Mobile Switching Center
SNSF Serving Node Selection Function
VLR Visitor Location Register References, both of which are incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method, of an entity in a wireless telecommunications network having a pool of Mobile Switching Centers (MSCs) and a Home Location Register (HLR), the method comprising the steps of:
   sending pages from a network interface to mobiles associated with a failed MSC of the pool of MSCs and experiencing termination isolation;
   receiving responses to the pages at the network interface from at least some of the mobiles;
   producing a registration having updated location information, with a processing unit, for each response received by the network interface; and
   sending from the network interface the registration to the HLR to end each mobile's termination isolation for which a response was received by the network interface, including the step of using a paging list of mobiles known to be assigned by the failed MSC, by the processing unit, to determine which mobiles in the network are to be sent the pages, the processing unit ceasing to send pages when the failed MSC recovers while some of the mobiles associated with the failed MSC have not been sent a page;
   wherein the pages sent to mobiles associated with the failed MSC are sent in direct response to detecting that the failed MSC has failed.

2. The method as described in claim 1 including the step of the processing unit removing each mobile from the paging list that leaves the pool of MSCs.

3. The method as described in claim 2 including the step of the processing unit waiting for at least a predetermined period of time for the failed MSC to recover prior to the network interface sending the pages.

4. The method as described in claim 3 including the step of sending from the network interface a message to the failed MSC, upon the failed MSC's recovery, that the failed MSC which has recovered is no longer responsible for servicing the mobiles which have been reassigned to another MSC or removed from the active database, wherein a reassignment trigger is based on page, or page response.

5. An entity in a wireless telecommunications network having a pool of Mobile Switching Centers (MSCs) and a Home Location Register (HLR) comprising:
   a network interface for sending pages to mobiles associated with a failed MSC of the pool of MSCs, the mobiles experiencing termination isolation and the interface receiving responses to the pages form at least some of the mobiles; and
   a processing unit producing a registration having updated location information for each response received by the network interface, the registration sent from the network interface to the HLR to end each mobile's termination isolation for which a response was received by the network interface, the processing unit uses a paging list of mobiles known to be assigned to the failed MSC to determine which mobiles in the network are to be sent the pages, the processing unit ceases to send pages when the failed MSC recovers while some of the mobiles associated with the failed MSC have not been sent a page;
   wherein the processing unit causes the network interface to send pages to mobiles associated with the failed MSC in direct response to detecting that the failed MSC has failed.

6. The entity as described in claim 5, wherein the processing unit removes each mobile from the paging list that leaves the pool of MSCs.

7. The entity as described in claim 6 wherein the processing unit waits for at least a predetermined period of time for the failed MSC to recover prior to the network interface sending the pages.

8. The entity as described in claim 7 wherein the network interface sends a message to the failed MSC, upon the failed MSC's recovery, that the failed MSC which has recovered is no longer responsible for servicing the mobiles which have been reassigned to another MSC or removed from the active database, wherein a reassignment trigger is based on page or page response.

* * * * *